(12) United States Patent
Claesson et al.

(10) Patent No.: US 11,987,268 B2
(45) Date of Patent: May 21, 2024

(54) SAFETY METHOD FOR A MODULAR AUTONOMOUS VEHICLE AND A CONTROL DEVICE THEREFOR (71) Applicant: Scania CV AB, Södertälje (SE)

(72) Inventors: André Claesson, Tullinge (SE); Linus Ährlig, Västerhaninge (SE); Robert Sjödin, Nyköping (SE); Morgan Colling, Hölö (SE); Sami Teppola, Nykvarn (SE); Mikko Kallio, Hölö (SE); Tomas Skeppström, Södertälje (SE)

(73) Assignee: Scania CV AB, Södertälje (SE)

( * ) Notice: Subject to any disclaimer, the term of this patent is extended or adjusted under 35 U.S.C. 154(b) by 700 days.

(21) Appl. No.: 17/050,854

(22) PCT Filed: Apr. 29, 2019

(86) PCT No.: PCT/SE2019/050381
§ 371 (c)(1),
(2) Date: Oct. 27, 2020

(87) PCT Pub. No.: WO2019/216804
PCT Pub. Date: Nov. 14, 2019

(65) Prior Publication Data
US 2021/0229700 A1 Jul. 29, 2021

(30) Foreign Application Priority Data
May 9, 2018 (SE) .................................... 1850548-7

(51) Int. Cl.
G01C 21/16 (2006.01)
B60W 60/00 (2020.01)
(Continued)

(52) U.S. Cl.
CPC ....... *B60W 60/0015* (2020.02); *B62D 63/025* (2013.01); *G08G 1/091* (2013.01);
(Continued)

(58) Field of Classification Search
CPC ......... B60W 60/0015; B60W 2420/42; B60W 2420/52; B62D 63/025; G08G 1/091;
(Continued)

(56) References Cited

U.S. PATENT DOCUMENTS 6,421,593 B1 7/2002 Kempen et al. ............... 701/48
7,926,832 B1 4/2011 Hall
(Continued)

FOREIGN PATENT DOCUMENTS

CN 101804829 A 8/2010
CN 102874084 A 1/2013
(Continued)

OTHER PUBLICATIONS

Novelty Search Report dated Feb. 1, 2018.
(Continued)

*Primary Examiner* — Brian P Sweeney
(74) *Attorney, Agent, or Firm* — Banner & Witcoff, Ltd.

(57) ABSTRACT

A safety method, performed by a control device for a vehicle assembled from a set of modules, the vehicle including at least two modules, including at least one drive module and at least one functional module. The control device is in any of the at least two modules. The at least one drive module has a pair of wheels and is configured to be autonomously operated. The method includes detecting (s101) an emergency situation in any of the at least two modules of the assembled vehicle, transmitting (s102) information about the detected emergency situation to a control center and controlling (s103) the module associated with the emergency situation to physically disconnect from the assembled (Continued)

US 11,987,268 B2
Page 2 vehicle. Also to a computer program, a computer-readable medium, a control device and a vehicle are included.

17 Claims, 6 Drawing Sheets

(51) Int. Cl.
  *B62D 63/02* (2006.01)
  *G01S 13/42* (2006.01)
  *G08G 1/09* (2006.01)
  *H04W 4/40* (2018.01)
  *H04W 4/90* (2018.01)

(52) U.S. Cl.
  CPC ............ *H04W 4/40* (2018.02); *H04W 4/90* (2018.02); *B60W 2420/403* (2013.01); *B60W 2420/408* (2024.01)

(58) Field of Classification Search
  CPC .......... H04W 4/40; H04W 4/90; H04W 4/38; H04W 4/44; H04L 67/125; B60P 3/42
  See application file for complete search history.

(56) References Cited

U.S. PATENT DOCUMENTS

| | | | |
|---|---|---|---|
| 2015/0217819 A1* | 8/2015 | Pojidaev | B62D 63/025 180/9.42 |
| 2016/0129958 A1 | 5/2016 | Byrnes et al. | |
| 2017/0197679 A1* | 7/2017 | Scaringe | B60K 1/02 |
| 2018/0050626 A1* | 2/2018 | Delp | B60L 50/60 |
| 2018/0345971 A1* | 12/2018 | Birnschein | G05D 1/0077 |

FOREIGN PATENT DOCUMENTS

| | | |
|---|---|---|
| CN | 104175852 A | 12/2014 |
| CN | 204854487 U | 12/2015 |
| CN | 105584544 A | 5/2016 |
| CN | 107020938 A | 8/2017 |
| DE | 10 2016 209 099 A1 | 7/2017 |
| DE | 102016209099 A1 | 7/2017 |
| RU | 2 297 923 C1 | 4/2007 |
| RU | 2297923 C1 | 4/2007 |

OTHER PUBLICATIONS

Office Action dated Oct. 25, 2018 in corresponding Swedish Patent Application No. 1850548-7.
International Search Report dated Jun. 17, 2019 in corresponding PCT International Application No. PCT/SE2019/050381.
Written Opinion dated Jun. 17, 2019 in corresponding PCT International Application No. PCT/SE2019/050381.
Apr. 2, 2022—(CN) First Office Action—App. No. 2019800296675.
Jul. 2, 2023—(BR) First Office Action—App. No. 1120200215635.

\* cited by examiner

SAFETY METHOD FOR A MODULAR AUTONOMOUS VEHICLE AND A CONTROL DEVICE THEREFOR

CROSS-REFERENCE TO RELATED APPLICATIONS

The present application is a 35 U.S.C. §§ 371 national phase conversion of PCT/SE2019/050381, filed Apr. 29, 2019, the contents of which are incorporated herein by reference, which claims priority of Swedish Patent Application No. 1850548-7 filed May 9, 2018, the contents of which are incorporated by reference herein. The PCT International Application was published in the English language.

TECHNICAL FIELD

The invention relates to a safety method, a computer program, a computer-readable medium, a control device and a vehicle for the foregoing.

BACKGROUND

Vehicles of today are typically manufactured for a specific purpose, e.g. a bus is manufactured for transporting people and a truck is manufactured for transporting goods. Such vehicles are typically manufactured and completely assembled in a factory or they may be partly assembled in a factory and completed at a body manufacturer. Once the vehicle is assembled, the vehicle may be used for the specific purpose. Thus, a bus may be used as a bus and a garbage truck may be used as a garbage truck. Different vehicles are thus needed for different purposes, which may require a large fleet of vehicles and which may be very costly. It may therefore be desired to be able to customize a vehicle depending on different missions.

There are, for example, known solutions where a truck can be rebuilt by changing a concrete mixer into a loading platform. This increases the flexibility and two different functions can be achieved by means of one single vehicle. Also, document US-2016/0129958 A discloses a modular electric vehicle using interchangeable vehicle assembly modules. The user can thereby disassemble and reassemble the vehicle for use in different applications. Disassembling and reassembling such a vehicle would, however, be very cumbersome and time consuming work. Furthermore, when a failure occurs in one of the known vehicle modules, it may be difficult to replace the failing module, which may result in that vehicle being unusable for a considerable period of time. It may also be cumbersome to transport the replacement module to the site of the vehicle with the failing module.

SUMMARY

Despite known solutions in the art, it is desired to develop a method in which at least some of the modules of an assembled vehicle may be rescued in case of an emergency situation in one of the modules. It is also desired to develop a method in which a load, such as passengers in a module of the assembled vehicle, can be rescued in case of an emergency situation in one of the modules. It is also desired to develop a method which will have a reduced impact on the environment in case of an emergency situation in one of the modules.

SUMMARY OF THE INVENTION

An object of the invention is therefore to achieve a modular vehicle, in which at least some of the modules of the vehicle may be rescued in case of an emergency situation in one of the modules.

Another object of the invention is to achieve a modular vehicle, in which load, such as passengers in a module of the vehicle, can be rescued in case of an emergency situation in one of the modules.

A further object of the invention is to achieve a modular vehicle, which will have a reduced impact on the environment in case of an emergency situation in one of the modules.

The herein mentioned objects are achieved with a safety method according to the invention.

According to an aspect of the invention a safety method, performed by a control device for a vehicle assembled from a set of modules is provided. The vehicle comprises at least two modules, including at least one drive module, and at least one functional module, wherein the control device is comprised in any of the at least two modules, and wherein the at least one drive module comprises a pair of wheels and is configured to be autonomously operated. The method comprises detecting an emergency situation in any of the at least two modules of the assembled vehicle transmitting information about the detected emergency situation to a control center and controlling the module associated with the emergency situation to physically disconnect from the assembled vehicle.

The above-mentioned objects are also achieved by a control device of a vehicle assembled from a set of the modules herein.

According to an aspect of the invention, a control device of a vehicle assembled from a set of modules is provided. The vehicle comprises at least two modules, including at least one drive module, and at least one functional module, wherein the control device is comprised in any of the at least two modules, and wherein the at least one drive module comprises a pair of wheels and is configured to be autonomously operated. The control device is configured to detect an emergency situation in any of the at least two modules of the assembled vehicle, transmit information about the detected emergency situation to a control center, and control the module associated with the detected emergency situation to physically disconnect from the assembled vehicle.

By such a method and by having a control device in any of the at least two modules, the assembled vehicle may quickly and easily be disassembled, without manual work, in case of an emergency situation. Thus, the module associated with the emergency situation is physically disconnected from the assembled vehicle, so that at least some of the modules of the vehicle can be rescued in case of an emergency situation in one of the modules.

At least one drive module may be used together with different functional modules. The functional modules may be designed for specific purposes. Therefore, by combining a drive module with a suitable functional module, it is possible to customize a vehicle depending on different missions. A functional module may be prepared to perform a specific function and the autonomously operated drive module may connect with the functional module to achieve an assembled vehicle customized for a certain mission. Thus, different emergency situations in any of the at least two modules of the assembled vehicle may be detected. The at least one functional module may be configured with a passenger compartment for accommodating passengers and may thus function as a bus when being assembled with the at least one drive module. If an emergency situation is detected in the at least one drive module, that drive module should be physically disconnected from the functional module, so that the passengers in the passenger compartment can be rescued and so that passengers in the passenger compartment are not affected by the emergency situation in the drive module.

The at least one drive module and thus the assembled vehicle may be configured to be autonomously operated. The control device comprised in any of the at least two modules may be configured to receive commands and instructions from a control center or an off-board system and to execute these commands/instructions. This way, the assembled vehicle can drive itself based on the received commands and instructions. The control device comprised in any of the at least two modules may control the assembled vehicle to be autonomously driven or operated also based on data from the at least one sensor element, taking situations that may happen during transportation into account. The detection of an emergency situation in any of the at least two modules of the assembled vehicle may be detected by a sensor element and the module associated with the emergency situation may be controlled, by the control device comprised in any of the at least two modules, to be physically disconnected from the assembled vehicle without instructions from the control center. The vehicle may be in an area, such as in a tunnel, in which the control center has no connection with the vehicle. In such a situation, the module associated with the emergency situation may be controlled by the control device comprised in any of the at least two modules, without instructions from the control center, to be physically disconnected from the assembled vehicle.

Information about a detected emergency situation in any of the at least two modules of the assembled vehicle is transmitted to the control center. Such information received by the control center can be used to control the module associated with the emergency situation to physically disconnect from the assembled vehicle. Also, the information can be used by the control center to call for emergency personnel depending on the type of emergency situation. In case of fire in one of the modules, the fire house, ambulance and police can be informed, by the control center, of the emergency situation and where the vehicle is situated. The control center can also, based on the received information, instruct another drive module or another assembled vehicle to drive to the place of the emergency situation in order to replace the vehicle or one of the modules, which have been associated with the emergency situation.

Examples of an emergency situation in the drive module may be fire, a tire explosion, or leakage of poisonous gases from an energy storage. The emergency situation in the functional module may depend on the type of functional module. Such an emergency situation in the functional module may be fire, a tire explosion, leakage of poisonous gases from an energy storage or from a load in the functional module.

Modularized vehicles are typically assembled at the customer's premises and the customer may thus buy a set of modules from a manufacturer. The assembled vehicle may comprise at least two modules including at least one drive module and at least one functional module. Such a modularized vehicle is applicable on all sorts of road vehicles and may thus relate to heavy vehicles, such as buses, trucks etc., which may be used on public roads.

In case of an emergency situation in one of the modules, at least some of the modules of the assembled vehicle may be rescued from damages. It is of particular importance that passengers in a module of the assembled vehicle can be rescued in case of an emergency situation. Also, it is of particular importance that an emergency situation in one of the modules will have a reduced impact on the environment.

According to an aspect of the present disclosure, a safety method, performed by a control device for a vehicle assembled from a set of modules, is provided. The vehicle comprises at least two modules, including at least one drive module, and at least one functional module, wherein the control device is comprised in any of the at least two modules, and wherein the at least one drive module comprises a pair of wheels and is configured to be autonomously operated. The method comprises detecting an emergency situation in any of the at least two modules of the assembled vehicle, transmitting information about the detected emergency situation to a control center and controlling the module associated with the emergency situation to physically disconnect from the assembled vehicle.

By such a method the assembled vehicle may quickly and easily be disassembled, without manual work, in case of an emergency situation. Thus, the module associated with the emergency situation is physically disconnected from the assembled vehicle, so that at least some of the modules of the vehicle can be rescued in case of an emergency situation in one of the modules.

At least one drive module may be used together with different functional modules. The functional modules may be designed for specific purposes. Therefore, by combining a drive module with a suitable functional module, it is possible to customize a vehicle depending on different missions. A functional module may be prepared to perform a specific function and the autonomously operated drive module may connect with the functional module to achieve an assembled vehicle customized for a certain mission. Thus, different emergency situations in any of the at least two modules of the assembled vehicle may be detected. The at least one functional module may be configured with a passenger compartment for accommodating passengers and may thus function as a bus when being assembled with the at least one drive module. If an emergency situation is detected in the at least one drive module, that drive module should be physically disconnected from functional module, so that the passengers in the passenger compartment can be rescued and so that passengers in the passenger compartment are not affected by the emergency situation in the drive module.

The at least one drive module and thus the assembled vehicle may be configured to be autonomously operated. The control device comprised in any of the at least two modules may be configured to receive commands and instructions from a control center or an off-board system and to execute these commands/instructions. This way, the assembled vehicle can drive itself based on the received commands and instructions. The control device comprised in any of the at least two modules may control the assembled vehicle to be autonomously driven or operated also based on data from the at least one sensor element, taking situations that may happen during transportation into account. The detection of an emergency situation in any of the at least two modules of the assembled vehicle may be detected by a sensor element and the module associated with the emergency situation may be controlled, by the control device comprised in any of the at least two modules, to be physically disconnected from the assembled vehicle without instructions from the control center. The vehicle may be in an area, such as in a tunnel, in which the control center has no connection with the vehicle. In such a situation, the module associated with the emergency situation may be controlled by the control device comprised in any of the at least two modules, without instructions from the control center, to be physically disconnected from the assembled vehicle.

Information about a detected emergency situation in any of the at least two modules of the assembled vehicle is transmitted to the control center. Such information received by the control center can be used to control the module associated with the emergency situation to physically disconnect from the assembled vehicle. Also, the information can be used by the control center to call for emergency personnel depending on the type of emergency situation. In case of fire in one of the modules, the fire house, ambulance and police can be informed, by the control center, of the emergency situation and where the vehicle is situated. The control center can also, based on the received information, instruct another drive module or another assembled vehicle to drive to the place of the emergency situation in order to replace the vehicle or one of the modules, which have been associated with the emergency situation.

Examples of an emergency situation in the drive module may be fire, a tire explosion, or leakage of poisonous gases from an energy storage. The emergency situation in the functional module may depend on the type of functional module. Such an emergency situation in the functional module may be fire, a tire explosion, leakage of poisonous gases from an energy storage or from a load in the functional module.

The method further comprises controlling the disconnected module to move away from the assembled vehicle and/or controlling the at least one remaining module of the assembled vehicle to move away from the disconnected module. Moving the modules a distance from each other after disconnection may increase the safety of the module which is not associated with the emergency situation. Thus, if the drive module is associated with the emergency situation and has been physically disconnected from the assembled vehicle, the drive module may be controlled to move away from the at least one remaining module of the assembled vehicle. In this way, the at least one remaining module of the assembled vehicle, which may be the functional module, is not associated with the emergency situation in the drive module. Alternatively or in combination, the at least one remaining module of the assembled vehicle, which may be the functional module, may be controlled to move away from the drive module.

According to an example, after transmitting information about the detected emergency situation to a control center, and before controlling the module associated with the emergency situation to physically disconnect from the assembled vehicle, the method further comprises receiving, from the control center, a command to physically disconnect the at least one drive module from the assembled vehicle. This method step may be an alternative to the physical disconnection by means of the control device, which is comprised in any of the at least two modules. Instead of controlling the module associated with the emergency situation to physically disconnect from the assembled vehicle using the control device, which is comprised in any of the at least two modules, the control center may send a command to the control device comprised in any of the at least two modules to physically disconnect the at least one drive module from the assembled vehicle. Thus, the control center may control the physical disconnection of the at least one drive module from the assembled vehicle. The command to physically disconnect the at least one drive module from the assembled vehicle may be received from the control center after information about the detected emergency situation to a control center has been transmitted and before the module associated with the emergency situation is controlled to physically disconnect from the assembled vehicle.

According to an example, before controlling the module associated with the emergency situation to physically disconnect from the assembled vehicle, the method further comprises activating an alarm informing about the emergency situation. The alarm may be activated by the control device comprised in any of the at least two modules. The activated alarm may inform individuals and other autonomously operated vehicles in the vicinity of and at a distance from the assembled vehicle that the assembled vehicle is associated with an emergency situation. The individuals may be humans and animals. The alarm may be a visible alarm and/or a sounding alarm. The alarm may also be delivered in form of a mobile phone message to individuals in the vicinity of the assembled vehicle.

The method further comprises identifying a safe space where the emergency situation in the assembled vehicle will have a reduced impact on the environment, and controlling the assembled vehicle to move to the identified safe space prior to physically disconnecting the module. The safe space identified by the control unit may be a space where individuals, buildings and/or other vehicles are/is at a distance from the assembled vehicle. The safe space may be an open space, such as an empty parking place, close to the place where the assembled vehicle is situated when the emergency situation occurs. At such a safe place, the emergency situation in the assembled vehicle will have a reduced impact on the environment. When the safe space has been identified, the assembled vehicle is controlled to move to the identified safe space. At the safe place, the module associated with the emergency situation is controlled to physically disconnect from the assembled vehicle. However, if the emergency situation is serious and there is a danger to human life, the module associated with the emergency situation may immediately be controlled to physically disconnect from the assembled vehicle, instead of first identifying a safe space.

According to an example, identifying a safe space where the emergency situation in the assembled vehicle will have a reduced impact on the environment is performed by means of a second sensor element comprising a radar, a lidar or a camera. Sensor equipment, such as radar, lidar and cameras arranged on any of the at least two modules, may detect individuals, buildings, other vehicles and obstacles close to the assembled vehicle. The radar, lidar and cameras can also detect the distance to individuals, buildings and other vehicles. The assembled vehicle is at a safe distance from individuals, buildings and other vehicles when the impact or effect of such individuals, buildings and other vehicles will be reduced by the emergency situation in the assembled vehicle or when such individuals, buildings and other vehicles will not be affected at all. Thus, a safe space has been identified if the assembled vehicle, at such safe space, is at a safe distance from individuals, buildings and other vehicles, where the impact or effect of such individuals, buildings and other vehicles will be reduced by the emergency situation in the assembled vehicle or when such individuals, buildings and other vehicles will not be affected at all.

According to an example, identifying a safe space where the emergency situation in the assembled vehicle will have a reduced impact on the environment is based on information from the control center via 4G, 5G, V2I, Wi-Fi or any other wireless communication means. As a complement or as an alternative to the second sensor element, information from the control center, usable for identifying of a safe space, may be transmitted via 4G, 5G, V2I, Wi-Fi or any other wireless communication means to the control unit in the assembled vehicle. The control center may have information about the traffic situation and other situations, such as specific events in the area close to the assembled vehicle, which may affect the identification of the safe space.

According to an example, identifying a safe space where the emergency situation in the assembled vehicle will have a reduced impact on the environment is based on the type of the at least one functional module. Additional information as to the result of what is detected by the second sensor element and/or the information from the control center, may be the type of the at least one functional module. If the functional module is adapted for accommodating individuals, such as passengers in a passenger compartment in a bus, a safe space must be identified, which allows the drive module to be disconnected and to be moved away from the functional module at a distance which will have a reduced impact or effect on the individuals in the functional module or will not affect such individuals at all.

According to an example, identifying a safe space where the emergency situation in the assembled vehicle will have a reduced impact on the environment is based on the type of load in the at least one functional module. Additional information as to the result of what is detected by the second sensor element and/or the information from the control center, may be the type of load in the at least one functional module. If the type of load in the functional module will have a negative effect on the environment, such as a poisonous effect, a safe space must be identified, in which such type of load in the functional module will have a reduced impact or effect on the environment or will not affect the environment at all.

According to an example, identifying a safe space where the emergency situation in the assembled vehicle will have a reduced impact on the environment is based on the type of emergency situation in the assembled vehicle. Additional information as to the result of what is detected by the second sensor element and/or the information from the control center, may be a type of emergency situation in the assembled vehicle. If the type of emergency situation in the assembled vehicle is fire, a safe space must be identified, in which fire in the assembled vehicle will have a reduced impact or effect on the environment or will not affect the environment at all.

According to an example, controlling the module associated with the emergency situation to physically disconnect from the assembled vehicle also comprises controlling the module to electrically disconnect from the assembled vehicle. At least two interfaces are electric interfaces, arranged for transferring electric energy and/or electric signals that may be transmitted between the modules of the assembled vehicle. The electric energy and electric signals may be wirelessly transmitted and/or conductively transmitted. By connecting the modules electrically, the modules can transfer energy between each other and also share information. The at least one drive module may, for example, control parts of the at least one functional module, such as opening and closing of doors, heating and cooling. At least two interfaces are electric interfaces arranged on the modules. The electric interfaces may transfer electric energy and/or electric signals. The electric interface may be a wireless interface or a conductive interface. In case of an emergency situation the control device may control the module associated with the emergency situation to electrically disconnect from the assembled vehicle. The electrical disconnection of the module associated with the emergency situation results in that electric energy and/or electric signals are not transferred from the module associated with the emergency situation to the at least one remaining module of the assembled vehicle. In this way, electric systems and/or electric energy storage units in the at least one remaining module of the assembled vehicle may not be affected or damaged by the emergency situation in the module associated with the emergency situation.

According to an example, wherein the assembled vehicle comprises two drive modules and at least one functional module, and wherein one of the drive modules is configured to operate as a master and the other drive module is configured to operate as a slave, the method further comprises, when an emergency situation is detected in the master drive module, the drive module configured to operate as a slave is controlled to operate as the master. One of the drive modules of the assembled vehicle is arranged to operate as a master and the other drive module is arranged to operate as a slave. The control device of one of the drive modules may be configured to operate the associated drive module as the master. The control device of the other drive module may be configured to operate the associated drive module as the slave. The master will decide how to operate the drive modules and thus how to operate the assembled vehicle. In addition, any further module, such as the functional module being connected to the drive module(s) and which comprises a control device, may become slave in the assembled vehicle. However, when an emergency situation is detected in the master drive module, the other drive module, which is configured to operate as a slave, should be controlled to operate as master. The control unit in the master drive module associated with the emergency situation may thus control the other drive module, which is configured to operate as a slave, to operate as master. The other drive module, which has become master, will transmit information about the detected emergency situation to a control center and thereafter control the module associated with the emergency situation to physically disconnect from the assembled vehicle.

The method further comprises, when an emergency situation is detected in the at least one functional module, controlling both drive modules to physically disconnect from the assembled vehicle. The control device in the drive module, which is configured to operate as a master, may control both drive modules to physically disconnect from the assembled vehicle. The control device in the drive module, which is configured to operate as a master, thus transmits signals to a control unit in the slave drive module to physically disconnect from the assembled vehicle. Such physical disconnection of both drive modules may also comprise an electrical disconnection of both drive modules from the assembled vehicle.

According to an example, an emergency situation is detected by means of a first sensor element, such as a temperature sensor, a pressure sensor, smoke sensor, particle sensor, gas sensor and/or a camera arranged on the assembled vehicle. Examples of an emergency situation in the drive module may be fire, a tire explosion, or leakage of poisonous gases from an energy storage. The emergency situation in the functional module may depend on the type of functional module. Such an emergency situation in the functional module may be fire, a tire explosion, leakage of poisonous gases from an energy storage or from a load in the functional module. Depending on the type of possible emergency situations that may occur in the modules, the modules may be provided with sensor elements that can detect such possible emergency situations.

The present disclosure also relates to a computer program comprising instructions which, when the program is executed by a computer, causes the computer to carry out the method disclosed above. The invention further relates to a non-transitory, non-volatile computer-readable medium comprising instructions, which when executed by a computer causes the computer to carry out the method disclosed above.

Furthermore, the present disclosure relates to a control device of a vehicle assembled from a set of modules. The vehicle comprises at least two modules, including at least one drive module, and at least one functional module. The control device is comprised in any of the at least two modules. The at least one drive module comprises a pair of wheels and is configured to be autonomously operated. The control device is configured to detect an emergency situation in any of the at least two modules of the assembled vehicle, transmit information about the detected emergency situation to a control center, and control the module associated with the detected emergency situation to physically disconnect from the assembled vehicle. The control device comprised in any of the at least two modules may be configured to receive commands and instructions from a control center or an off-board system and to execute these commands/instructions. In this way, the assembled vehicle can drive itself based on the received commands and instructions. The control device comprised in any of the at least two modules may control the assembled vehicle to be autonomously driven or operated also based on data from the at least one sensor element, taking situations that may happen during transportation into account. The detection of an emergency situation in any of the at least two modules of the assembled vehicle may be detected by a sensor element and the module associated with the emergency situation may be controlled, by the control device comprised in any of the at least two modules, to be physically disconnected from the assembled vehicle without instructions from the control center. The vehicle may be in an area, such as in a tunnel, in which the control center has no connection with the vehicle. In such a situation, the module associated with the emergency situation may be controlled by the control device comprised in any of the at least two modules, without instructions from the control center, to be physically disconnected from the assembled vehicle.

Information about a detected emergency situation in any of the at least two modules of the assembled vehicle is transmitted to the control center. Such information received by the control center can be used to control the module associated with the emergency situation to physically disconnect from the assembled vehicle. Also, the information can be used by the control center to call for emergency personnel depending on the type of emergency situation. In case of fire in one of the modules, the fire house, ambulance and police can be informed, by the control center, of the emergency situation and where the vehicle is situated. The control center can also, based on the received information, instruct another drive module or another assembled vehicle to drive to the place of the emergency situation in order to replace the vehicle or one of the modules, which have been associated with the emergency situation.

According to an aspect of the present disclosure, a vehicle assembled from a set of modules is provided, wherein the vehicle comprises at least one control device. The set of modules comprises: at least one drive module; and at least one functional module. The vehicle comprises two physically connected modules. The vehicle further comprises at least one control device as disclosed herein. The two physically connected modules may each comprise a control device as disclosed herein.

BRIEF DESCRIPTION OF THE DRAWINGS

Additional objectives, advantages and novel features of the invention will be apparent to one skilled in the art from the following details, and through exercising the invention. While the invention is described below, it should be apparent that the invention may not be limited to the specifically described details. One skilled in the art, having access to the teachings herein, will recognize additional applications, modifications and incorporations in other areas, which are within the scope of the invention.

Below is a description of, as examples, preferred embodiments with reference to the enclosed drawings, in which.

DETAILED DESCRIPTION

The present disclosure will now be further illustrated with reference to the appended figures.

Figure 1A:
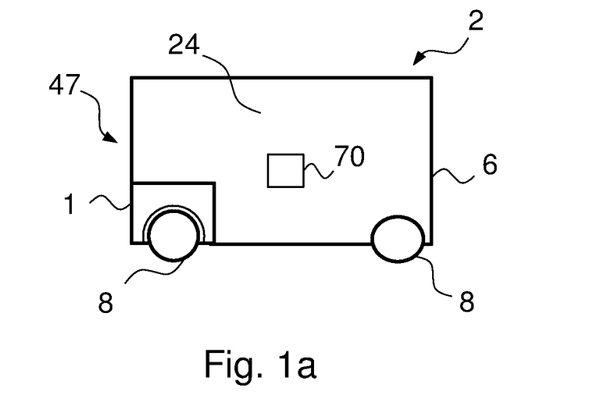
FIG. 1a schematically illustrates a side view of a drive module and a functional module according to an embodiment.

FIG. 1a schematically illustrates a side view of an assembled vehicle 2 comprising a drive module 1 and a functional module 6 according to an embodiment. The drive module 1 comprises a pair of wheels 8 and is configured to be autonomously operated, which means that the assembled vehicle 2 is configured to be autonomously operated. The functional module 6 may be provided with wheels 8, but generally a functional module 6 cannot move on its own. Instead, the functional module 6 needs to be connected to at least one drive module 1 to be able to move. The functional module 6 may accommodate or support a load. The at least one functional module 6 may be configured for transporting goods and may thus function as a truck 47 when being assembled with at least one drive module 1. In FIG. 1a, the drive module 1 and the functional module 6 are physically connected to each other, so that interfaces 14 arranged on the drive module 1 and the functional module 6 are physically connected to each other. The control device 16, 70 is comprised in any of the two modules 1, 6. The drive module 1 may comprise a control device which hereinafter will be referred to as a first control device 16. The functional module 6 may comprise a control device, which hereinafter will be referred to as a second control device 70.

Figure 1B:
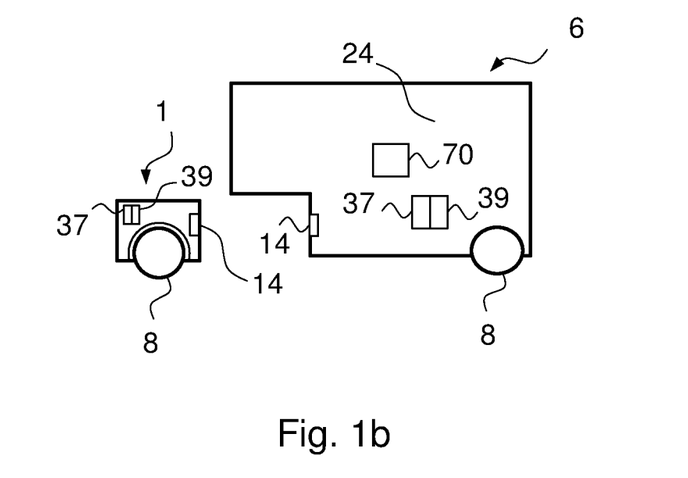
FIG. 1b schematically illustrates an assembled vehicle according to an embodiment.

FIG. 1b schematically illustrates a side view where the drive module 1 has been physically disconnected from the assembled vehicle 2 and thus from the functional module 6, so that the drive module 1 and the functional module 6 are separated. In FIG. 1b also the drive module 1 has been moved in a direction away from the functional module 6, which is the remaining module of the assembled vehicle 2. The disconnection of the modules may be a result of an emergency situation that has been detected in any of the at least two modules 1, 6 of the assembled vehicle 2. Therefore, the drive module 1, which may have been associated with the emergency situation, has been controlled to be physically disconnected from the assembled vehicle 2.

Figure 2:
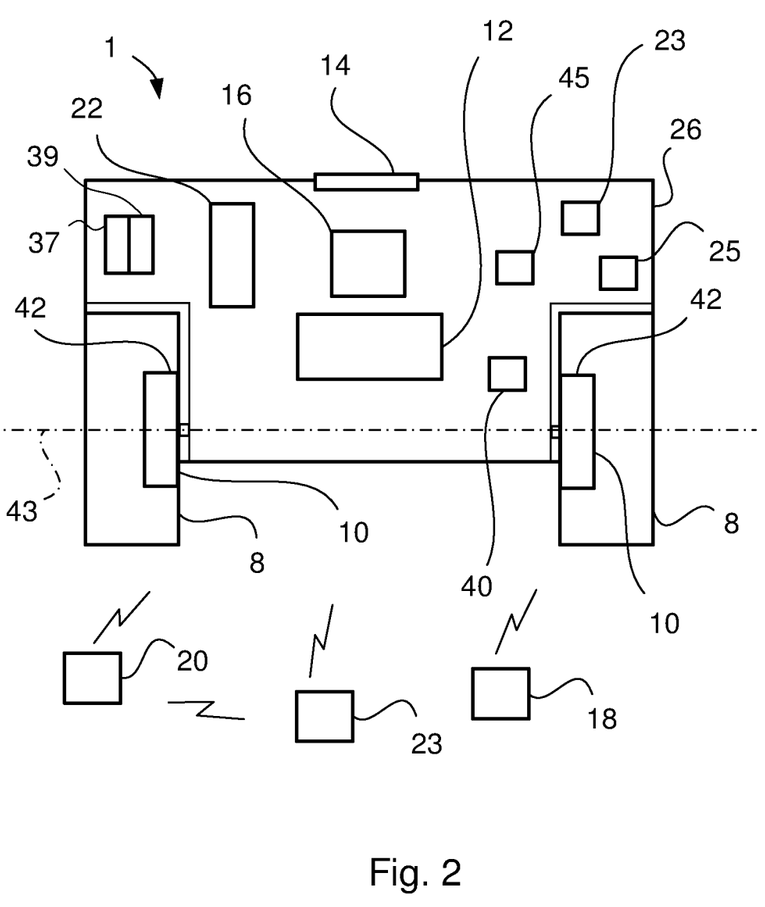
FIG. 2 schematically illustrates a drive module in a section view.

FIG. 2 schematically illustrates a drive module 1 in a section view. The drive module 1 may comprise a pair of wheels 8. The wheels 8 may be arranged at the first and second sides 28, 30 of the drive module 1. One wheel 8 may be arranged at the first side 28 and the other wheel 8 may be arranged at the second side 30. A steering unit 40 may be connected to the wheels 8. The steering unit 40 may make the drive module 1 steerable. The pair of wheels 8 may be so arranged at the drive module 1 that a center axis 43 of each wheel 8 coincides with each other. Each wheel 8 has a center axis 43 and may be arranged at the drive module 1 so that each wheel 8 may rotate about its center axis 43. When the center axis 43 of each wheel 8 coincides with each other the drive module 1 has good maneuvring abilities. Also, the drive module 1 may be configured to enable a pivoting movement about the coinciding center axis 43 of the two wheels 1. This pivoting movement of the drive module 1 may be useful when connecting and disconnecting the drive module 1 with other modules 6. The first control device 16 configured to operate the drive module 1 as an independently driven unit may control the pivoting movement of the drive module 1.

The drive module 1 may comprise at least two interfaces 14 for transferring electric energy and/or transmitting electric signals, and for physically connection, which will be described in more detail below in relation to FIG. 2.

The drive module 1 may comprise at least one propulsion unit 10 connected to the pair of wheels 8. The propulsion unit 10 may be an electric machine connected to the wheels 8. Two electric machines may be arranged as propulsion units 10 in the drive module 1. One electric machine 10 may be connected to one wheel 8 and the other electric machine 10 may be connected to the other wheel 8. The electric machines 10 may be arranged in the rim 42 of the wheels 8. The wheels 8 may thereby be driven independently of each other. The electric machines 10 may also work as generators and generate electric energy when braking the wheels 8. Instead of electric machines 10 as a propulsion unit 10, the at least one propulsion unit 10 may be an internal combustion engine, such as an otto engine or a diesel engine connected to the wheels 8.

The drive module 1 may comprise at least one energy storage unit 12 for providing the propulsion unit 10 with energy. In the case where the propulsion unit 10 is an electric engine, the energy storage unit 12 may be an electric battery. The electric battery may be recharged with electric energy. Alternatively, when the electric battery is discharged, the electric battery may be replaced by another charged electric battery. In the case where the propulsion unit 10 is an internal combustion engine, the energy storage unit 12 may be a fuel tank with fuel suitable for the internal combustion engine.

The drive module 1 may comprise a separate closed cooling system 22, for cooling the at least one propulsion unit 10 and the at least one energy storage unit 12. Provided with a separate closed cooling system 22 the drive module 1 may be operated as an independently driven unit, without any need of an external cooling arrangement. Also, the drive module 1 does not have to be connected to a cooling system of a functional module 6. The separate closed cooling system 22 may be based on a liquid coolant or based on a forced flow of cooling air.

The drive module 1 may comprise an alarm 23 informing about an emergency situation associated with the drive module 1 or the functional module 6. The alarm 23 may be activated by the control device 16, 70 comprised in any of the at least two modules 1, 6. The activated alarm 23 may inform individuals and other autonomously operated vehicles in the vicinity of and at a distance from the assembled vehicle 2 that the assembled vehicle 2 is associated with an emergency situation. The individuals may be humans and animals. The alarm 23 may be a visible alarm, which may comprise flashing lights. The alarm 23 may also be a sounding alarm which may comprise a siren. The visible alarm and the sounding alarm may act in common for informing about the emergency situation. The alarm 23 may also be delivered in the form of a mobile phone message to individuals in the vicinity of the assembled vehicle 2. An emergency situation may be detected by means of a first sensor element 25, such as a temperature sensor, a pressure sensor, smoke sensor, particle sensor, gas sensor and/or a camera arranged in the drive module 1 and/or in the functional module 6.

As mentioned above, the drive module 1 may comprise a first control device 16. The first control device 16 may be configured to operate the drive module 1 as an independently driven unit. The drive module 1 may transport itself without any external driven unit such as a towing vehicle 2. The drive module 1 may transport itself by means of the at least one propulsion unit 10. The drive module 1 may be configured to be autonomously operated. Thus, the first control device 16 may be configured to control the operation of the drive module 1. The first control device 16 may be configured to transmit control signals to the various systems and components of the drive module 1 for controlling for example the steering and the propulsion of the drive module 1. The first control device 16 may be adapted to operate the drive module 1 autonomously based on received commands. The first control device 16 may thus be adapted to receive commands from a remotely located off-board system or a control center 20 and to convert the command into control signals for controlling the various systems and components of the drive module 1. The first control device 16 may also be configured to receive data about the surroundings from at least one second sensor element 45, and based on this data control the drive module 1. The first control device 16 may be implemented as a separate entity or distributed in two or more physical entities. The first control device 16 may comprise one or more computers. The first control device 16 may thus be implemented or realized by the first control device 16 comprising a processor and a memory.

The drive module 1 may be adapted to be configured based on a function to be performed by the drive module 1 itself or as an assembled vehicle 2. The drive module 1 may itself thus constitute a vehicle. The first control device 16 of the drive module 1 may be adapted to receive, from the control center 20, instructions to configure the drive module 1 in a certain way, based on a function to be performed by the drive module 1 itself or the assembled vehicle 2. Thus, the drive module 1 may be adapted to be configured when it is connected to a functional module 6 and thus forms a part of an assembled vehicle 2. The drive module 1 may also be adapted to be dynamically configured based on the surroundings in which the vehicle 2 will perform its function. Thus, different suspension characteristics may for example be required if the vehicle 2 will be operated in a rough terrain compared to if the vehicle 2 will be operated on a highway. The drive module 1 being adapted to be dynamically configured means that the configuration of the drive module 1 is non-static and the drive module 1 can thus be reconfigured depending on various factors. The first control device 16 of the drive module 1 may be adapted to receive, from the control center 20, instructions to configure the drive module 1 in a certain way, based on a function to be performed by the assembled vehicle 2. The drive module 1 may be adapted to receive configuration instructions before or when it has been connected with a functional module 6 and a vehicle 2 thereby is assembled. The drive module 1 may also be adapted to receive configuration instructions partly before or partly after it has been connected with a functional module 6. Thus, the drive module 1 may be adapted to be configured when it is connected to a functional module 6 and thus forms a part of an assembled vehicle 2. The control center 20 may for example determine that certain suspension characteristics, certain brake settings and/or a certain steering ratio are required for the function to be performed by the assembled vehicle 2. Different configurations of the drive module 1 may thus be required when the drive module 1 forms part of a vehicle 2 performing the function of transporting people, transporting goods, shovelling snow etc. The drive module 1 may also be adapted to be dynamically configured based on the surroundings in which the vehicle 2 will perform its function. Thus, different suspension characteristics may for example be required if the vehicle 2 will be operated in a rough terrain compared to if the vehicle 2 will be operated on a highway. The control center 20 may thus transmit instructions to the first control device 16 of the drive module 1, such that the control device 16 configures the drive module accordingly. The configuration instructions from the control center 20 may also be based on the selected functional module 6 connected with the drive module 1.

The first control device 16 of the drive module 1 may alternatively be configured to control the drive module 1 through control signals received from a remotely located operator 18. The operator 18 may geographically be orientated close to, far away from or at any distance from the drive module 1. The drive module 1 may thus be remote-controlled based on the control signals. Thus, when the drive module 1 should be moved a short distance, an operator 18 may wireless or conductively by wire remotely control the drive module 1. In case of a wireless communication between the first control device 16 of the drive module 1 and the surrounding, such as other modules, the drive module 1 may comprise a transmitter 37 and a receiver 39 for the wireless communication. However, the first control device 16 may alternatively comprise a built in transmitter and receiver. The drive module 1 will not be provided with a cabin for the operator 8. Thus, when the drive module 1 should be moved a short distance, an operator 18 may wirelessly or conductively by wire remotely control the assembled vehicle 2 or one of the drive modules 1. Hence, the operator 18 may in such a case control the assembled vehicle 2 or one of the drive modules 1 at a distance from the assembled vehicle 2 or one of the drive modules 1, or from a place in the assembled vehicle 2 or on one of the drive modules 1.

The drive module 1 may be adapted to communicate with a traffic system 23. The first control device 16 of the drive module 1 may be adapted to communicate with a traffic system 23. The communication between the first control device 16 of the drive module 1 and the traffic system 23 may be performed via the control center 20. However, the communication between the first control device 16 of the drive module 1 and the traffic system 23 may alternatively, or in combination with the control center 20, be performed via sensors 45 arranged at the drive module 1 or via receivers arranged on the drive module 1, which receives signals wirelessly from transmitters arranged in the traffic system 23. The first control device 16 of the drive module 1 may thereby be able to determine the status of traffic lights, notice accidents etc. The first control device 16 of the drive module 1 may be adapted to communicate directly with such a traffic system 23 or it may be adapted to communicate with such a traffic system 23 via the control center 20. In FIG. 2, the different components may be connected to each other by means of wires.

As mentioned above, the drive module 1 may be configured to constitute a part of an assembled vehicle 2. Such a vehicle 2 is assembled from a set of modules 1, 6. The assembled vehicle 2 may comprise at least one functional module 6. The assembled vehicle 2 may further comprise at least one drive module 1 as disclosed in FIGS. 1*a* and 1*b*. The assembled vehicle 2 may comprise two drive modules 1. The drive module 1 may be adapted to be configured based on a function to be performed by the drive module 1 itself or as an assembled vehicle 2. However, the drive module 1 may itself thus constitute a vehicle.

The drive module 1 may be adapted to be releasably connected to either a second drive module 1 and/or a functional module 6 for forming an assembled vehicle 2. At least one of the sides of the drive module 1 may thus have a shape that allows the drive module 1 to be releasably connected to the second drive module 1 and/or the functional module 6.

The at least two interfaces 14 may be physical interfaces 14, arranged to physically connect the drive module 1 with the second drive module 1 and/or the functional module 6.

The drive module 1 may comprise at least two interfaces 14, each arranged on different sides of the drive module 1. The interfaces 14 of the drive module 1 may be releasably connectable to a corresponding interface 14 of the second drive module 1 and/or the functional module 6. Thus, each module in the set of modules 1, 6 may comprise at least one interface 14, which may be releasably connectable to a corresponding interface 14 on another module.

The at least two interfaces 14 may be electric interfaces 14, arranged for transferring electric power and/or transmitting electric signals between the drive module 1 and the second drive module 1. The electrical interface 14 may be a wireless interface 14 or a conductive interface 14. By connecting the drive module 1 and the functional module 6 electrically, the modules 1, 6 may transfer power between each other and also share information. The drive module 1 may, for example, control parts of the functional module 6, such as opening and closing of doors, heating and cooling.

The drive module 1 may be configured to communicate with the second drive module 1 and/or the functional module 6 connected to the drive module 1. This communication may be performed by means of the interface 14. The communication between the modules 1, 6 may be wireless or conducted by wire. In case of a wireless communication between the control devices 16, 70 of the modules 1, 6, each module 1, 6 may comprise a transmitter 37 and a receiver 39 for the wireless communication. In case of a conductive communication between the control devices 16, 70 of the modules 1, 6 by wire, the functional module 6 may comprise a wire, which connects the interfaces 14 of the functional module 6. When the two drive modules 1 are connected to the interfaces 14 of the functional module 6, the first control devices 16 of the drive modules 1 may communicate with each other and with the second control device 70 of the functional module 6 via the wire in the functional module 6.

The drive module 1 may comprise at least one second sensor element 45 for detecting and registering objects in the surrounding of the drive module 1. The at least one second sensor element 45 may be a proximity sensor for detecting and registering the distance to objects, such as vehicles, pedestrians, traffic lights and/or buildings. Based on information from at least one second sensor element 45, the drive module 1 may be operated such that a safe distance to the surrounding objects is maintained and accidents avoided. The at least one second sensor element 45 may be a radar, a lidar or a camera.

Figure 3A:
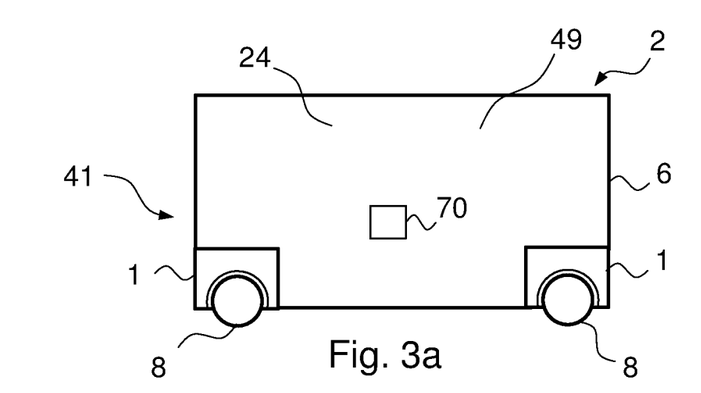
FIG. 3a schematically illustrates a side view of two drive modules and a functional module according to an embodiment.

FIG. 3*a* schematically illustrates a side view of an assembled vehicle 2 comprising two drive modules 1 and a functional module 6 according to an embodiment. The at least one functional module 6 may be configured with a passenger compartment 49 for accommodating passengers and may thus function as a bus 41 when being assembled with the drive modules 1. It is to be understood that the shape of the two drive modules 1 may be identical and are configured as the drive module 1 described above. In FIG. 3*a*, the drive modules 1 are connected to the functional module 6 and the interfaces 14 of the drive modules 1 and the functional module 6 are thus connected with each other. The second control device 70 of the functional module 6 may be configured to communicate with the control center 20 mentioned with regard to FIG. 2. The second control device 70 may also be configured to communicate with the first control device 16 of the drive module 1.

By selecting the at least one functional module 6 and two drive modules 1 based on a function to be performed, a customized vehicle 2 can be assembled, which may be suitable for a function to be performed. Also, an assembled vehicle 2 may be achieved, which is adapted to the surroundings and the operating conditions of the vehicle 2. The control center 20 may for example determine that certain suspension characteristics, certain brake settings and/or a certain steering ratio are required for the function to be performed by the assembled vehicle 2. Different configurations of the drive module 1 may thus be required when the drive modules 1 form part of the assembled vehicle 2 performing the function of transporting people, transporting goods, shovelling snow etc. The drive modules 1 may also be adapted to be dynamically configured based on the surroundings in which the assembled vehicle 2 will perform its function. The configuration instructions from the control center 20 may thus be based on the selected functional module 6 connected with the drive module 1.

Figure 3B:
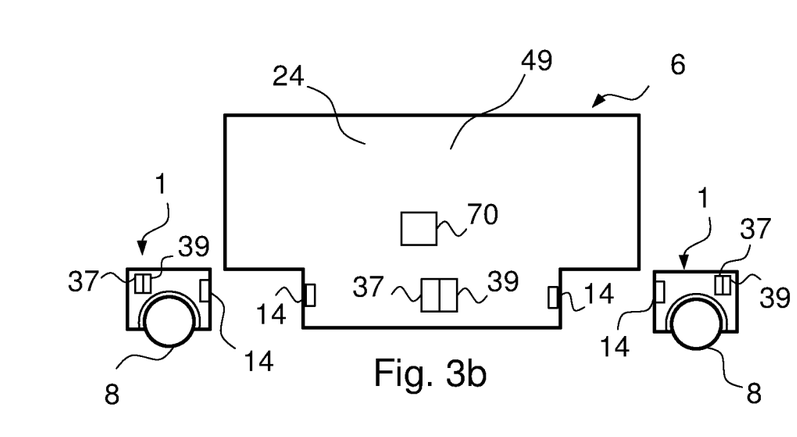
FIG. 3b schematically illustrates an assembled vehicle according to an embodiment.

In FIG. 3*b*, the drive modules 1 and the functional module 6 have been physically disconnected from the assembled vehicle 2 and thus from the functional module 6, so that the drive modules 1 and the functional module 6 are separated from each other. The disconnection of the modules may be a result of an emergency situation that has been detected in any of the modules of the assembled vehicle 2. In case functional module 6 is associated with the emergency situation, both drive modules 1 should be controlled to be physically disconnected from the assembled vehicle 2. By physically disconnect both drive modules 1 from the functional module 6, the drive modules 1 can be rescued in case of an emergency situation in the functional module 6.

In FIG. 3*b* also, the drive modules 1 have been moved in a direction away from the functional module 6, which is the remaining module of the assembled vehicle 2. Moving the modules a distance from each other after disconnection may increase the safety of the module which is not associated with the emergency situation. Thus, if the drive module 1 is associated with the emergency situation and has been physically disconnected from the assembled vehicle 2, the drive module 1 may be controlled to move away from the at least one remaining module of the assembled vehicle 2. Since the second control device 70 may be configured to communicate with the first control device 16 of the respective drive module 1, it may be possible to control the physically disconnection of the drive modules 1 by means of the second control device 70 in the functional module 6.

Examples of an emergency situation in the drive module 1 may be fire, a tire explosion, or leakage of poisonous gases from an energy storage. The emergency situation in the functional module 6 may depend on the type of functional module 6. Such an emergency situation in the functional module 6 may be fire, a tire explosion, leakage of poisonous gases from an energy storage or from a load in the functional module 6.

Figure 4A:
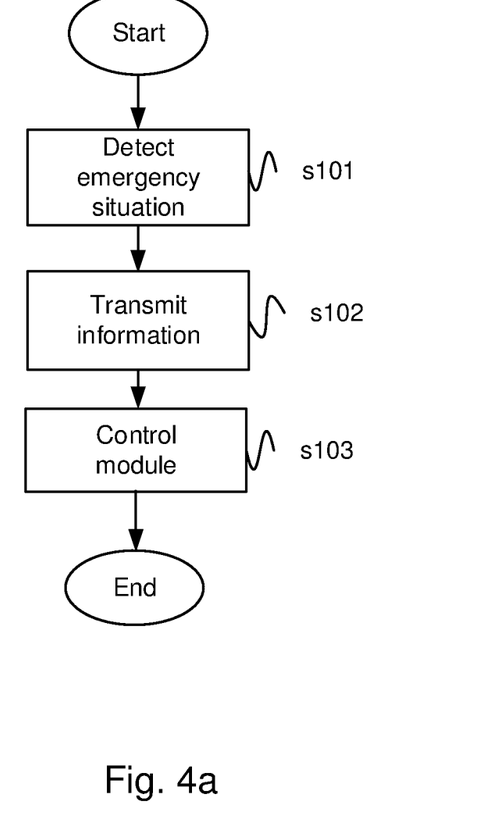
FIG. 4a illustrates a flow chart for a safety method according to an embodiment.

FIG. 4*a* illustrates a flow chart for a safety method, performed by a control device 16, 70 for a vehicle 2 assembled from a set of modules according to an embodiment. The method thus relates to the control device 16, 70 and the set of modules as disclosed in FIGS. 1 and 3. The set of modules thus comprises at least one drive module 1 and at least one functional module 6. The control device 16, 70 is comprised in any of the at least two modules 1, 6. The at least one drive module 1 comprises a pair of wheels and is configured to be autonomously operated. The method comprises detecting s101 an emergency situation in any of the at least two modules 1, 6 of the assembled vehicle 2, transmitting s102 information about the detected emergency situation to a control center 20 and controlling s103 the module associated with the emergency situation to physically disconnect from the assembled vehicle 2.

The at least one drive module 1 and thus the assembled vehicle 2 may be configured to be autonomously operated. The control device 16, 70 comprised in any of the at least two modules 1, 6 may be configured to receive commands and instructions from a control center 20 or an off-board system and to execute these commands/instructions. In this way, the assembled vehicle 2 can drive itself based on the received commands and instructions. The control device 16, 70 comprised in any of the at least two modules 1, 6 may control the assembled vehicle 2 to be autonomously driven or operated also based on data from the at least one second sensor element 45, taking situations that may happen during transportation into account. The detection of an emergency situation in any of the at least two modules 1, 6 of the assembled vehicle 2 may be detected by a first sensor element 25 and the module associated with the emergency situation may be controlled, by the control device 16, 70 comprised in any of the at least two modules 1, 6, to be physically disconnected from the assembled vehicle 2 without instructions from the control center 20. The vehicle 2 may be in an area, such as in a tunnel, in which the control center 20 has no connection with the vehicle 2. In such a situation, the module associated with the emergency situation may be controlled by the control device 16, 70 comprised in any of the at least two modules 1, 6, without instructions from the control center 20, to be physically disconnected from the assembled vehicle 2.

Information about a detected emergency situation in any of the at least two modules 1, 6 of the assembled vehicle 2 is transmitted to the control center 20. Such information received by the control center 20 can be used to control the module associated with the emergency situation to physically disconnect from the assembled vehicle 2. Also, the information can be used by the control center 20 to call for emergency personnel depending on the type of emergency situation.

Controlling s103 the module associated with the emergency situation to physically disconnect from the assembled vehicle 2 may also comprise controlling s103, the module to electrically disconnect from the assembled vehicle 2. In case of an emergency situation the control device 16, 70 may control the module associated with the emergency situation to electrically disconnect from the assembled vehicle 2. The electrical disconnection of the module associated with the emergency situation results in that electric energy and/or electric signals are not transferred from the module associated with the emergency situation, to the at least one remaining module of the assembled vehicle 2.

The emergency situation may be detected by means of a first sensor element 25, such as a temperature sensor, a pressure sensor, smoke sensor, particle sensor, gas sensor and/or a camera arranged on the assembled vehicle 2.

FIG. 4a illustrates a flow chart for a safety method, performed by a control device 16, 70 for a vehicle 2 assembled from a set of modules 1, 6 according to an embodiment. The method thus relates to the control device 16, 70 and the set of modules 1, 6 as disclosed in FIGS. 1 and 3. The set of modules 1, 6 thus comprises at least one drive module 1 and at least one functional module 6. The control device 16, 70 is comprised in any of the at least two modules 1, 6. The at least one drive module 1 comprises a pair of wheels and is configured to be autonomously operated. The method comprises detecting s101 an emergency situation in any of the at least two modules 1, 6 of the assembled vehicle 2. The detection of an emergency situation in any of the at least two modules 1, 6 of the assembled vehicle 2 may be detected by a first sensor element 25.

Figure 4B:
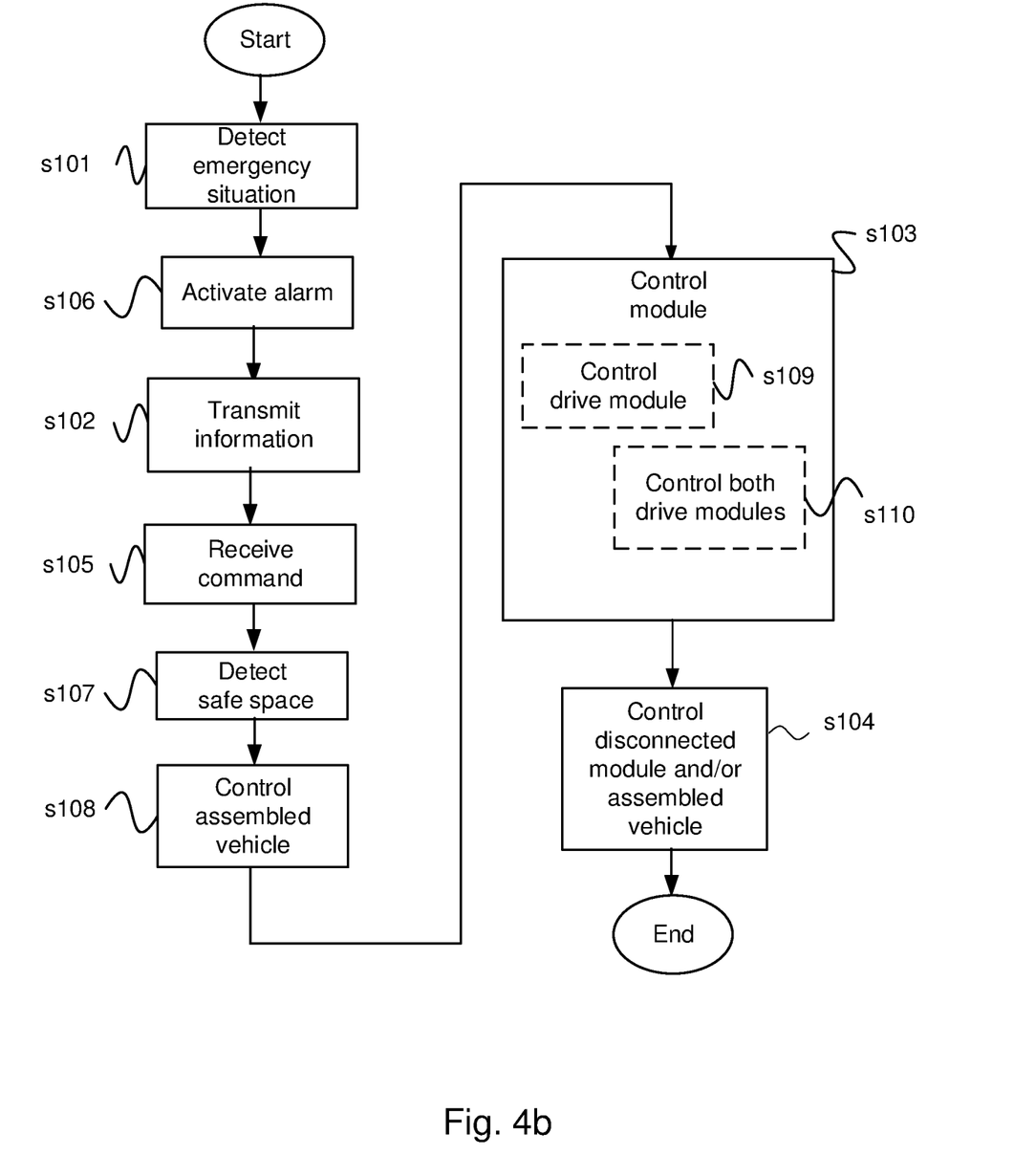
FIG. 4b illustrates a flow chart for a safety method according to an embodiment.

The method further comprises activating s106 an alarm 23 informing about the emergency situation. The alarm 23 may be activated by the control device 16, 70 comprised in any of the at least two modules 1, 6. The activated alarm 23 may inform individuals and other autonomously operated vehicles in the vicinity of and at a distance from the assembled vehicle 2 that the assembled vehicle 2 is associated with an emergency situation. The individuals may be humans and animals. The alarm 23 may be a visible alarm and/or a sounding alarm. The alarm 23 may also be delivered in the form of a mobile phone message to individuals in the vicinity of the assembled vehicle 2.

After the alarm 23 has been activated s106, information is transmitted s102 about the detected emergency situation to a control center 20. The information can be used by the control center 20 to call for emergency personnel depending on the type of emergency situation.

As an alternative option, after transmitting information about the detected emergency situation to a control center 20, the method may comprise receiving s105, from the control center 20, a command to physically disconnect the at least one drive module 1 from the assembled vehicle 2. This method step may be an alternative to the p physical disconnection by means of the control device 16, 70, which is comprised in any of the at least two modules 1, 6. Instead of controlling the module 1, 6 associated with the emergency situation to physically disconnect from the assembled vehicle 2 using the control device 16, 70, which is comprised in any of the at least two modules 1, 6, the control center 20 may transmit a command to the control device 16, 70 comprised in any of the at least two modules 1, 6 to physically disconnect the at least one drive module 1 from the assembled vehicle 2. Thus, the control center 20 may control the physical disconnection of the at least one drive module 1 from the assembled vehicle 2.

The method further comprises identifying s107 a safe space where the emergency situation in the assembled vehicle 2 will have a reduced impact on the environment, and controlling s108 the assembled vehicle 2 to move to the identified safe space prior to physically disconnecting the module 1, 6. The safe space identified by the control unit may be a space where individuals, buildings and/or other vehicles are/is at a distance from the assembled vehicle 2. The safe space may be an open space, such as an empty parking place, close to the place where the assembled vehicle 2 is situated when the emergency situation occurs. At such a safe space, the emergency situation in the assembled vehicle 2 will have a reduced impact on the environment. When the safe space has been identified, the assembled vehicle 2 is controlled to move to the identified safe space.

According to an example, the identifying s107 of the safe space is performed by means of a second sensor element 45 comprising a radar, a lidar, a camera and/or information from the control center 20 via 4G, 5G, V2I, Wi-Fi or any other wireless communication means. A second sensor element 45, such as radar, lidar and cameras arranged on any of the at least two modules 1, 6 may detect individuals, buildings, other vehicles and obstacles close to the assembled vehicle 2. The radar, lidar and cameras can also detect the distance to individuals, buildings and other vehicles.

The method further comprises controlling s103 the module 1, 6 associated with the emergency situation to physically disconnect from the assembled vehicle 2. Controlling s103 the module 1, 6 associated with the emergency situation to physically disconnect from the assembled vehicle 2 may also comprise controlling s103 the module 1, 6 to electrically disconnect from the assembled vehicle 2. In case of an emergency situation, the control device 16, 70 may control the module 1, 6 associated with the emergency situation to electrically disconnect from the assembled vehicle 2. The electrically disconnection of the module 1, 6 associated with the emergency situation results in that electric energy and/or electric signals are not transferred from the module 1, 6 associated with the emergency situation, to the at least one remaining module 1, 6 of the assembled vehicle 2.

Wherein the assembled vehicle 2 comprises two drive modules 1 and at least one functional module 6, and wherein one of the drive modules 1 is configured to operate as a master and the other drive module 1 is configured to operate as a slave, the method further comprises, when an emergency situation is detected in the master drive module 1, controlling s109 the drive module 1 configured to operate as a slave to operate as master. When an emergency situation is detected in the at least one functional module 6, controlling s110 both drive modules 1 to physically disconnect from the assembled vehicle 2. The control device 16 in the drive module 1, which is configured to operate as a master, may control both drive modules 1 to physically disconnect from the assembled vehicle 2. The control device 16 in the drive module 1, which is configured to operate as a master, thus transmits signals to a control unit in the slave drive module 1 to disconnect physically from the assembled vehicle 2. Such physical disconnection of both drive modules 1 may also comprise a disconnection of both drive modules 1 from the assembled vehicle 2.

The method further comprises controlling s104 the disconnected module 1, 6 to move away from the assembled vehicle 2 and/or controlling the at least one remaining module 1, 6 of the assembled vehicle 2 to move away from the disconnected module 1, 6. Moving the modules 1, 6 a distance from each other after disconnection may increase the safety of the module 1, 6 which is not associated with the emergency situation. Thus, if the drive module 1 is associated with the emergency situation and has been physically disconnected from the assembled vehicle 2, the drive module 1 may be controlled to move away from the at least one remaining module 1, 6 of the assembled vehicle 2.

Figure 5:
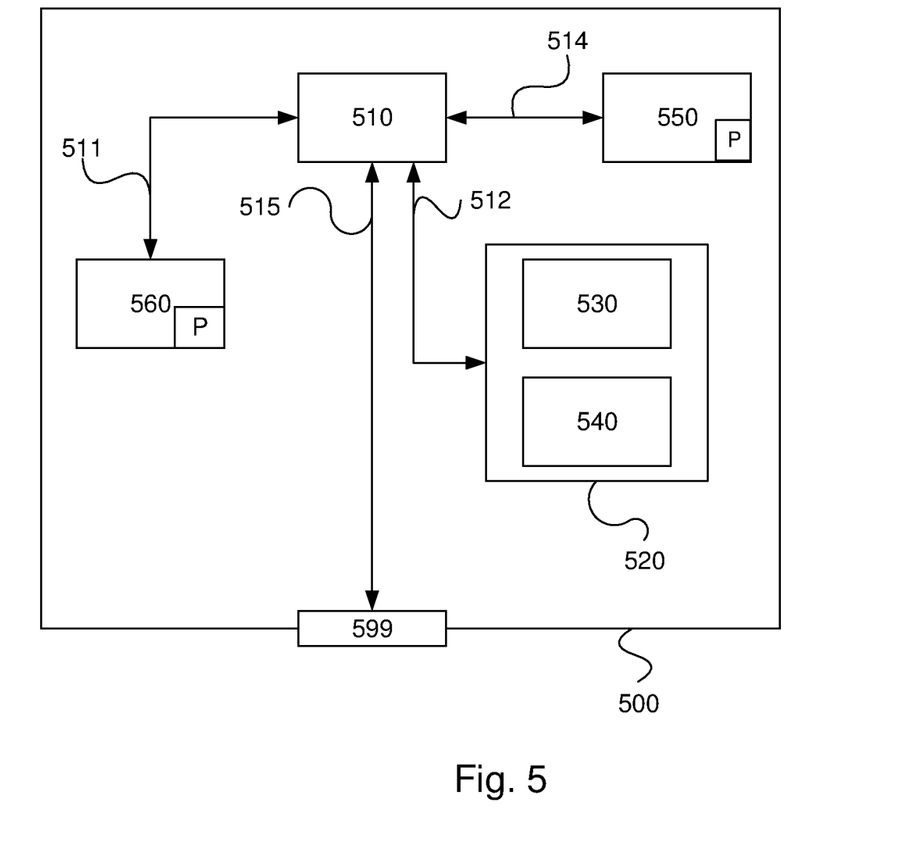
FIG. 5 schematically illustrates a control device or computer according to an embodiment.

FIG. 5 is a diagram of a version of a device 500. The control device 16, 20 of the vehicle 2 assembled from a set of modules 1, 6, which vehicle 2 comprising at least two modules 1, 6 may in a version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an ND converter, a time and date input and transfer unit, an event counter and an interruption controller (not depicted). The non-volatile memory 520 also has a second memory element 540.

There is provided a computer program P which comprises routines for performing the safety method. The program P may be stored in an executable form or in a compressed form in a memory 560 and/or in a read/write memory 550.

Where the data processing unit 510 is described as performing a certain function, it means that the data processing unit 510 effects a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The foregoing description of the embodiments has been furnished for illustrative and descriptive purposes. It is not intended to be exhaustive, or to limit the embodiments to the variants described. Many modifications and variations will obviously be apparent to one skilled in the art. The embodiments have been chosen and described in order to best explicate principles and practical applications, and to thereby enable one skilled in the art to understand the embodiments in terms of its various embodiments and with the various modifications that are applicable to its intended use. The components and features specified above may, within the framework of the embodiments, be combined between different embodiments specified.

The invention claimed is:

1. A safety method, performed by a control device for a vehicle assembled from a set of modules, the vehicle comprising one or more of at least two modules, including:
   at least one drive module; and
   at least one functional module;
   wherein the control device is comprised in any one or more of the at least two modules and wherein the at least one drive module comprises a pair of wheels and is configured to be autonomously operated;
   the method comprising:
   detecting, by a first sensor element, an emergency situation in any one or more of the at least two modules of the assembled vehicle;
   transmitting, by a transmitter, information about the detected emergency situation to a control center; and
   controlling the module associated with the emergency situation to physically disconnect from the assembled vehicle.

2. The method according to claim 1, further comprising:
   controlling the disconnected module to move away from the at least one remaining module of the assembled vehicle and/or controlling the at least one remaining module of the assembled vehicle to move away from the disconnected module.

3. The method according to claim 1, wherein, after transmitting information about the detected emergency situation to a control center, and before controlling the module associated with the emergency situation, physically disconnecting the module from the assembled vehicle;
   the method further comprising:
   receiving, from the control center, a command to physically disconnect the at least one drive module from the assembled vehicle.

4. The method according to claim 1, wherein, before controlling the module associated with the emergency situation to physically disconnect from the assembled vehicle, the method further comprises:
   activating an alarm informing about the emergency situation.

5. The method according to claim 1, further comprising:
   identifying a safe space where the emergency situation in the assembled vehicle will have a reduced impact on the environment; and
   controlling the assembled vehicle to move to the identified safe space prior to physically disconnecting the module.

6. The method according to claim 5, wherein identifying the safe space where the emergency situation in the assembled vehicle will have a reduced impact on the environment is performed by means of a second sensor element comprising a radar, a lidar or a camera.

7. The method according to claim 5, wherein identifying the safe space where the emergency situation in the assembled vehicle will have a reduced impact on the environment is based on information from the control center via 4G, 5G, V2I, Wi-Fi or any other wireless communication means.

8. The method according to claim 5, wherein identifying the safe space where the emergency situation in the assembled vehicle will have a reduced impact on the environment is based on a type of the at least one functional module.

9. The method according to claim 5, wherein identifying the safe space where the emergency situation in the assembled vehicle will have a reduced impact on the environment is based on a type of load in the at least one functional module.

10. The method according to claim 5, wherein identifying the safe space where the emergency situation in the assembled vehicle will have a reduced impact on the environment is based on a type of emergency situation in the assembled vehicle.

11. The method according to claim 1, wherein controlling the module associated with the emergency situation to physically disconnect from the assembled vehicle also comprises controlling the module to electrically disconnect from the assembled vehicle.

12. The method according to claim 1, wherein the assembled vehicle comprises two drive modules and the at least one functional module, and wherein one of the drive modules is configured to operate as a master and the other drive module is configured to operate as a slave;
the method further comprises, when an emergency situation is detected in the master drive module:
controlling the drive module configured to operate as a slave to operate as master.

13. The method according to claim 12, further comprising, when an emergency situation is detected in the at least one functional module:
controlling both drive modules to physically disconnect from the assembled vehicle.

14. The method according to claim 1, further comprising detecting an emergency situation by means of the first sensor element including a temperature sensor, a pressure sensor, a smoke sensor, a particle sensor, a gas sensor and/or a camera arranged on the assembled vehicle.

15. A computer memory storing program instructions which, when the program instructions are executed by a computer, causes the computer to carry out a method performed by the computer for a vehicle assembled from a set of modules, wherein the vehicle comprises one or more of at least two modules including: at least one drive module and at least one functional module, wherein the computer is comprised in any one or more of the at least two modules and wherein the at least one drive module comprises a pair of wheels and is configured to be autonomously operated, wherein the method comprises:

detecting, by a first sensor element, an emergency situation in any one or more of the at least two modules of the assembled vehicle;
transmitting, by a transmitter, information about the detected emergency situation to a control center; and
controlling the module associated with the emergency situation to physically disconnect from the assembled vehicle.

16. A control device of a vehicle assembled from a set of modules, the vehicle comprising one or more of at least two modules, including:
at least one drive module; and
at least one functional module;
wherein the control device is comprised in any one or more of the at least two modules, and wherein the at least one drive module comprises a pair of wheels and is configured to be autonomously operated;
the control device being configured to:
detect, by a first sensor element, an emergency situation in any one or more of the at least two modules of the assembled vehicle;
transmit, by a transmitter, information about the detected emergency situation to a control center; and
control the module associated with the detected emergency situation to physically disconnect from the assembled vehicle.

17. A vehicle assembled from a set of modules, wherein the vehicle comprises at least one control device, wherein the set of modules comprises one or more of at least two modules including: at least one drive module, and at least one functional module; and wherein the control device is comprised in any one or more of the at least two modules; and wherein the at least one drive module comprises a pair of wheels and is configured to be autonomously operated; and the control device being configured to:
detect, by a first sensor element, an emergency situation in any one or more of the at least two modules of the assembled vehicle;
transmit, by a transmitter, information about the detected emergency situation to a control center; and
control the module associated with the detected emergency situation to physically disconnect from the assembled vehicle.

* * * * *